US007672758B2

United States Patent
Astruc

(10) Patent No.: US 7,672,758 B2
(45) Date of Patent: Mar. 2, 2010

(54) METHOD AND A DEVICE FOR ASSISTING THE PILOTING OF A ROTARY WING AIRCRAFT IN THE VICINITY OF A LANDING OR TAKEOFF POINT

(75) Inventor: Joel Astruc, Puyricard (FR)

(73) Assignee: Eurocopter, Marignane (FR)

( * ) Notice: Subject to any disclaimer, the term of this patent is extended or adjusted under 35 U.S.C. 154(b) by 651 days.

(21) Appl. No.: 10/591,008

(22) PCT Filed: Sep. 26, 2005

(86) PCT No.: PCT/FR2005/002383

§ 371 (c)(1),
(2), (4) Date: Aug. 29, 2006

(87) PCT Pub. No.: WO2006/035153

PCT Pub. Date: Apr. 6, 2006

(65) Prior Publication Data

US 2007/0181750 A1  Aug. 9, 2007

(30) Foreign Application Priority Data

Sep. 28, 2004  (FR) .................................. 04 10275

(51) Int. Cl.
*G08B 23/00* (2006.01)
*G08G 5/00* (2006.01)
*G08G 5/02* (2006.01)
*G08G 5/04* (2006.01)
*B64F 1/18* (2006.01)

(52) U.S. Cl. .................... 701/16; 701/4; 701/9; 701/10; 701/14; 244/75.1; 244/76 R; 244/183; 340/945; 340/946; 340/953; 342/29; 342/33; 342/34

(58) Field of Classification Search ....... 244/3.15–3.17, 244/4–7, 10–13, 17.11, 17.13, 17.23, 75.1, 244/76, 175, 183–188, 192–195, 220, 221; 340/549, 945–951, 953–957, 963–980; 701/1–11, 701/14–18, 22–28, 116, 120, 200–218, 220, 701/221, 223–225, 300–302; 73/1.01, 1.75, 73/1.78; 342/29, 33, 35; 702/127, 142, 144
See application file for complete search history.

(56) References Cited

U.S. PATENT DOCUMENTS 5,371,581 A * 12/1994 Wangler et al. ............. 356/5.01
5,406,286 A *  4/1995 Tran et al. ..................... 342/13
5,445,021 A *  8/1995 Cattoen et al. ............. 73/178 R (Continued)

FOREIGN PATENT DOCUMENTS

FR           2 717 934           9/1995

(Continued)

*Primary Examiner*—Jack W. Keith
*Assistant Examiner*—Jonathan M Dager
(74) *Attorney, Agent, or Firm*—Young & Thompson

(57) ABSTRACT

The invention relates to a method for assisting the piloting of an aircraft in the vicinity of a landing or takeoff point, by:
determining the locus of entry and/or exit points for a given approach and/or departure altitude that are not safe for reaching the landing and/or takeoff point; and
presenting a diagram including said locus on a display device.

18 Claims, 3 Drawing Sheets

U.S. PATENT DOCUMENTS

| | | | |
|---|---|---|---|
| 5,555,175 A * | 9/1996 | D'orso | 701/5 |
| 5,616,031 A * | 4/1997 | Logg | 434/38 |
| 5,839,080 A * | 11/1998 | Muller et al. | 701/9 |
| 5,892,462 A * | 4/1999 | Tran | 340/961 |
| 5,936,552 A * | 8/1999 | Wichgers et al. | 340/963 |
| 5,952,570 A * | 9/1999 | Berlioz et al. | 73/178 H |
| 6,005,581 A * | 12/1999 | Gjullin | 345/582 |
| 6,021,374 A * | 2/2000 | Wood | 701/301 |
| 6,043,756 A * | 3/2000 | Bateman et al. | 340/945 |
| 6,101,431 A * | 8/2000 | Niwa et al. | 701/14 |
| 6,134,500 A * | 10/2000 | Tang et al. | 701/202 |
| 6,161,063 A * | 12/2000 | Deker | 701/4 |
| 6,173,219 B1 * | 1/2001 | Deker | 701/3 |
| 6,199,008 B1 * | 3/2001 | Aratow et al. | 701/120 |
| 6,222,464 B1 * | 4/2001 | Tinkel et al. | 340/945 |
| 6,272,404 B1 * | 8/2001 | Amano et al. | 701/3 |
| 6,401,038 B2 * | 6/2002 | Gia | 701/301 |
| 6,411,869 B2 * | 6/2002 | Permanne | 701/3 |
| 6,421,603 B1 * | 7/2002 | Pratt et al. | 701/206 |
| 6,424,889 B1 * | 7/2002 | Bonhoure et al. | 701/3 |
| 6,502,015 B1 * | 12/2002 | Brookes et al. | 701/3 |
| 6,505,102 B2 * | 1/2003 | Morizet et al. | 701/3 |
| 6,577,947 B1 * | 6/2003 | Kronfeld et al. | 701/202 |
| 6,678,588 B2 * | 1/2004 | He | 701/3 |
| 6,683,609 B1 * | 1/2004 | Baron et al. | 345/419 |
| 6,690,299 B1 * | 2/2004 | Suiter | 340/973 |
| 6,700,482 B2 * | 3/2004 | Ververs et al. | 340/500 |
| 6,744,382 B1 * | 6/2004 | Lapis et al. | 340/971 |
| 6,822,624 B2 * | 11/2004 | Naimer et al. | 345/9 |
| 7,010,398 B2 * | 3/2006 | Wilkins et al. | 701/3 |
| 7,212,216 B2 * | 5/2007 | He et al. | 345/629 |
| 7,248,952 B2 * | 7/2007 | Ma et al. | 701/25 |
| 7,268,703 B1 * | 9/2007 | Kabel et al. | 340/984 |
| 7,321,812 B2 * | 1/2008 | Silberman et al. | 701/3 |
| 7,337,043 B2 * | 2/2008 | Bull | 701/1 |
| 7,363,152 B2 * | 4/2008 | Sjanic | 701/209 |
| 7,379,816 B2 * | 5/2008 | Southard et al. | 701/300 |
| 7,411,519 B1 * | 8/2008 | Kuntman et al. | 340/968 |
| 7,428,451 B2 * | 9/2008 | Artini et al. | 701/9 |
| 7,471,995 B1 * | 12/2008 | Robinson | 701/3 |
| 7,477,164 B1 * | 1/2009 | Barber | 340/945 |
| 7,479,920 B2 * | 1/2009 | Niv | 342/65 |
| 2003/0043058 A1 * | 3/2003 | Jamieson et al. | 340/961 |
| 2003/0107499 A1 | 6/2003 | Lepere et al. | |
| 2003/0195672 A1 * | 10/2003 | He | 701/3 |
| 2003/0206120 A1 * | 11/2003 | Ishihara et al. | 340/970 |
| 2004/0015274 A1 * | 1/2004 | Wilkins et al. | 701/3 |
| 2004/0160341 A1 * | 8/2004 | Feyereisen et al. | 340/970 |
| 2005/0182528 A1 * | 8/2005 | Dwyer et al. | 701/3 |
| 2005/0206533 A1 * | 9/2005 | Rogers et al. | 340/979 |
| 2006/0031004 A1 * | 2/2006 | Lundberg | 701/200 |
| 2006/0220920 A1 * | 10/2006 | McCauley et al. | 340/963 |
| 2006/0250280 A1 * | 11/2006 | Chen et al. | 340/974 |
| 2006/0253231 A1 * | 11/2006 | Khatwa | 701/9 |

FOREIGN PATENT DOCUMENTS

| | | |
|---|---|---|
| FR | 2 747 492 | 10/1997 |
| FR | 2 783 500 | 3/2000 |
| WO | WO 00/39775 | 6/2000 |
| WO | WO 02/39058 | 5/2002 |
| WO | WO 02/45048 | 6/2002 |

* cited by examiner

METHOD AND A DEVICE FOR ASSISTING THE PILOTING OF A ROTARY WING AIRCRAFT IN THE VICINITY OF A LANDING OR TAKEOFF POINT

The present invention relates to a method and a device for assisting the pilot of a rotary wing aircraft in the vicinity of a landing or takeoff point.

The technical field of the invention is that of providing pilot's associate systems for rotary wing aircraft such as helicopters.

BACKGROUND OF THE INVENTION

In order to construct a safe flight plan, a pilot can make use of aeronautical charts showing relief; by applying overflight margins, the pilot can deduce waypoints and flight altitudes that can subsequently be input blind. This inputting can be performed using a dedicated terminal of the control and display unit (CDU) type. The safety of that technique is rather poor since it is associated both with the quality with which points and segments are input and with the quality of the use made of aeronautical charts.

Numerous anti-collision systems have been proposed for aircraft.

According to U.S. Pat. No. 6,421,603 B1, the pilot defines a route and the system verifies interference between the route and the ground on the basis of data contained in a "terrain" database. The pilot can modify the route in order to find a safe solution by successive iterations.

According to U.S. Pat. No. 6,424,889 B1 and French patent No. 2,789,771, a system calculates a horizontal trajectory for avoiding dangerous zones as a function of the relief known to a terrain database and as a function of constraints given by the pilot; that makes it possible to define a route that is deemed to be safe relative to obstacles, but it requires large computation resources. That system does not allow the pilot to control generation of the route; the pilot discovers the proposed solution once the calculation has terminated, and can then change the constraints in order to run a new calculation.

Those systems are not adapted to approach or takeoff stages, and they do not lead to an ergonomic display of the risks encountered during said stages of flight.

U.S. patent application Ser. No. 2003 107499 and French patent application FR 2 813 963 propose a device for providing assistance in air navigation for mounting on board an aircraft, the device including a display module arranged to display in real time a two-dimensional representation of the relief in front of the aircraft relative to the position and the movement of the aircraft; that representation relates to a region displayed in the form of an angular sector of apex corresponding to the position of the aircraft; according to those documents, the issuing of alerts is inhibited in part during a landing or takeoff stage.

Such a display system is not adapted to defining a safe approach or takeoff procedure for a rotary wing aircraft.

Document WO 02/39058 relates to a system for assisting air navigation by displaying navigation data in a horizontal mode and in a vertical mode on the appearance of an event such as detecting a nearby obstacle.

Such a system is not adapted to defining a safe approach or takeoff procedure for an arbitrary landing point.

OBJECTS AND SUMMARY OF THE INVENTION

An object of the invention is to give the pilot of an aircraft means for rapidly defining a landing point and an approach and/or takeoff procedure that are safe relative to the relief surrounding said point.

An object of the invention is to enable said means to be usable in flight so that the pilot, when performing a specific mission of the emergency medical service (EMS) type, can construct a portion of the future route while already in flight. To do this, the invention must be fast in use and must give the pilot a complete perception of the route being constructed.

An object of the invention is to make it possible to define landing and takeoff procures that can be used equally well under visual meteorological conditions (VMC) in which the pilot can ensure safety visually relative to the relief, and under instrument meteorological conditions (IMC) in which the pilot cannot see the relief, and flight safety is ensured by precisely following a route that has previously been found to be safe by using terrain databases.

An object of the invention is to propose a method and a device for assisting the piloting of such an aircraft in those stages of flight.

An object of the invention is to provide a method and a device for assisting in air navigation, which method and device are improved, or remedy at least in part, the omissions and the drawbacks of prior art methods and devices.

According to an aspect of the invention, a method is provided for assisting the piloting of an aircraft with respect to a given landing point and approach altitude (or takeoff point and departure altitude), the method comprising determining the locus of all entry points for landing procedures that are not safe relative to the relief, and/or the locus of all exit points for takeoff procedures that are not safe relative to the relief, and displaying the locus or locuses on a display screen showing the geographical environment around a landing point.

In the meaning of the present application, the term "landing point" is used, depending on context, to designate either a landing point proper or a takeoff point.

The pilot can thus position the entry or exit point of the landing/takeoff procedure directly and interactively in a zone where the entry or exit points are deemed to be safe, while optimizing the selected point as a function of constraints such as wind direction, zones where overflying is prohibited, and the performance of the aircraft.

The invention makes it possible to determine a landing point that maximizes landing solutions, and thus makes it possible to select a landing point for which landing solutions are closest to the above-mentioned constraints.

In another aspect of the invention, in order to determine the locus of these entry and/or exit points corresponding to procedures that are not safe, a surface is determined that rests against obstacles extending around the landing point. This surface includes an angle point that is attached to (coincides with) the landing point, and presents an upwardly-flared shape starting from said angle point. The intersection between said surface and a plane or level corresponding to the approach or departure altitude is calculated in order to obtain a limit curve extending in said plane or level; then the locus of unsafe entry and/or exit points is determined as being that portion of the plane or level that lies outside said limit curve.

In the meaning of the present application, the term "obstacle" can designate either an obstacle that is natural or geographical (i.e. a projecting point or zone of natural relief), or else an obstacle that is artificial, such as a structure and/or a building standing on the ground.

The coordinates of natural obstacles are generally contained in a database referred to as a "digital terrain model".

In accordance with a preferred characteristic of the invention, a diagram is presented to the pilot that includes the landing point, said limit curve, and at least one circular arc, in particular a semicircle or a complete circle centered on the landing point and corresponding to a (pre)determined descent (or climb) slope; said slope (measured relative to the horizontal) is preferably situated in a range of 2° to 15°.

Preferably, at least a portion of the diagram which is situated outside said limit curve relative to the point of the diagram representing the landing point, and which thus forms part of the locus of entry or exit points to be avoided, is presented in a color (e.g. red) or a texture (e.g. shading) representing danger of collision with obstacles surrounding the landing point.

In order to determine said surface, and thus said limit curve, various approach (or departure) templates or profiles can be used: a template or profile may comprise one or more segments that are generally rectilinear.

When the profile is constituted by a single rectilinear segment, said surface is generated by the straight lines passing through the landing point and resting against obstacles situated around the landing point; said surface then presents the general shape of a cone or a half-cone (of non-circular section) with its apex corresponding to the landing point.

The limit curve formed by the trace of said surface in a plane corresponding to the approach or departure altitude is constituted by generally curved portions corresponding to the trace in said plane of a ray from the landing point and grazing the tops of obstacles surrounding the landing point; these portions generally form a discontinuous limit curve where a gap between two adjacent portions of said limit curve corresponds to a safe approach or departure zone.

In a variant, it is possible to provide descent profiles that are more complex, either being rectilinear in the horizontal plane and made up of a plurality of segments of fixed and/or varying slopes, or made up of segments that are not in alignment, neither in the vertical plane nor in the horizontal plane, having some characteristics that are fixed and others that vary. These complex profiles are characterized by an entry point situated at the previously-defined safe altitude H, by a landing point, and possibly by a geographical orientation.

In particular it is possible to use a template or profile made up of a plurality of segments that are in alignment in the horizontal plane, but that are of different slopes, in order to optimize anti-noise trajectories.

In another variant corresponding to a "T" approach, the profile is made up of three consecutive segments:
  a first segment that is horizontal;
  a second segment in the same horizontal plane as the first segment, but followed using a heading that is at 90° to the first segment; and
  a third segment sloping towards the landing point (PP) and following the same heading as the second segment.

The segments are consecutive or adjacent (meeting in pairs at respective common points); the projections onto the horizontal plane of two consecutive segments may be in alignment, if both segments have exactly the same heading.

Under all circumstances, resting the template (anchored on the landing point) on the obstacles surrounding the landing point makes it possible to determine the locus of entry and/or exit points that are not safe in the plane or level corresponding to the altitude under consideration.

In another aspect of the invention, there is provided a device enabling the method that is defined and described herein to be implemented, which device is embarked or is suitable for embarking on board an aircraft, the device comprising:
  a digital terrain model possibly associated with a database containing the characteristics (coordinates and dimensions) of artificial obstacles;
  a computer provided with means for reading the digital terrain model and possibly also the characteristics of artificial obstacles;
  a tool for inputting into the computer the coordinates of a landing or takeoff point, and where appropriate an approach or departure altitude, the tool being suitable for being manipulated by a pilot of the aircraft;
  means co-operating with the computer to respond to the coordinates of the landing or takeoff point and the approach or departure altitude to determine the locus of entry and/or exit points for said altitude that are unsafe given a (pre)determined climb/descent template or profile; and
  means for presenting said locus to the pilot.

The invention enables the pilot to see directly all approach and departure procedure solutions that are safe relative to the configuration of the relief. The pilot can thus immediately select a solution that best satisfies other constraints without needing to proceed by successive iterations.

The method of the invention enables the pilot to construct the trajectory to be followed.

This function can be used independently of any other function so as to select in a single iteration a landing point and corresponding approach and departure procedures that are safe relative to the relief.

It can also be associated with the devices described in the above-specified patents, then making it possible to avoid the stage of successive iterations used for finding a safe trajectory.

BRIEF DESCRIPTION OF THE DRAWINGS

Other characteristics and advantages of the invention appear in the following description which refers to the accompanying drawings and which, without being limiting in any way, illustrates preferred implementations of the invention.

MORE DETAILED DESCRIPTION

Figure 1:
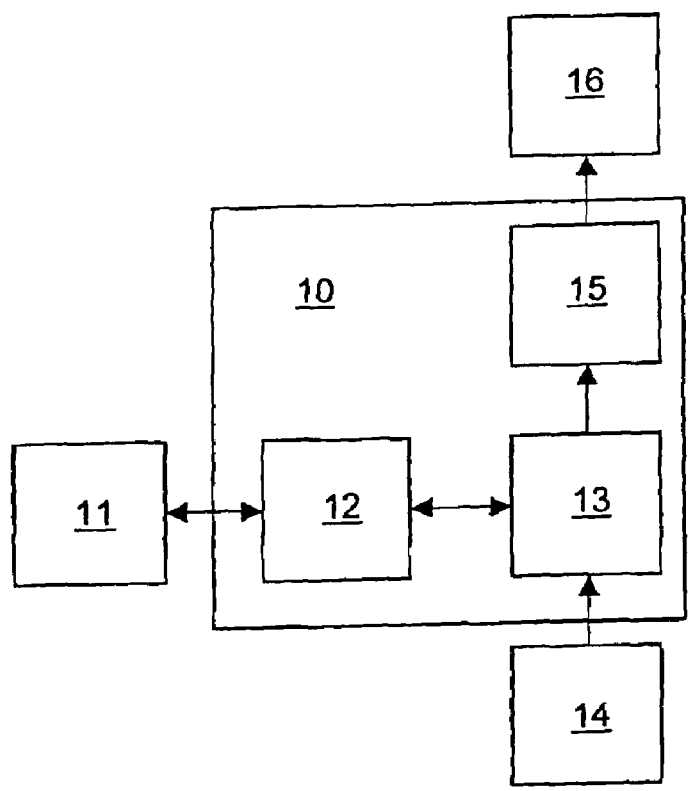
FIG. 1 is a diagram showing the organization of the main components of a device of the invention.
Figure 2:
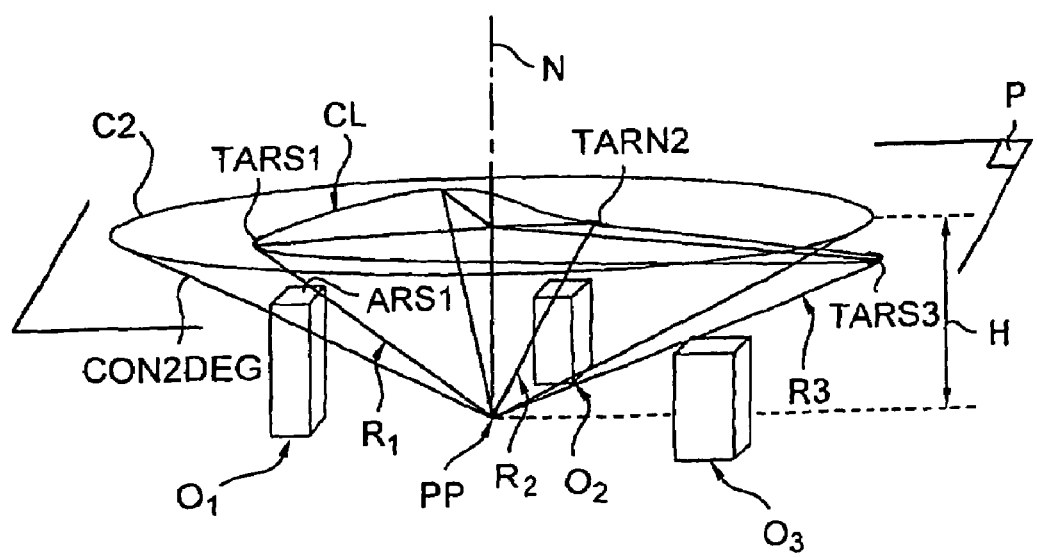
FIG. 2 is a diagram illustrating how the portions of a limit curve are calculated by scanning the space surrounding a landing point by a simple rectilinear approach profile, in one implementation of the invention.
Figure 4:
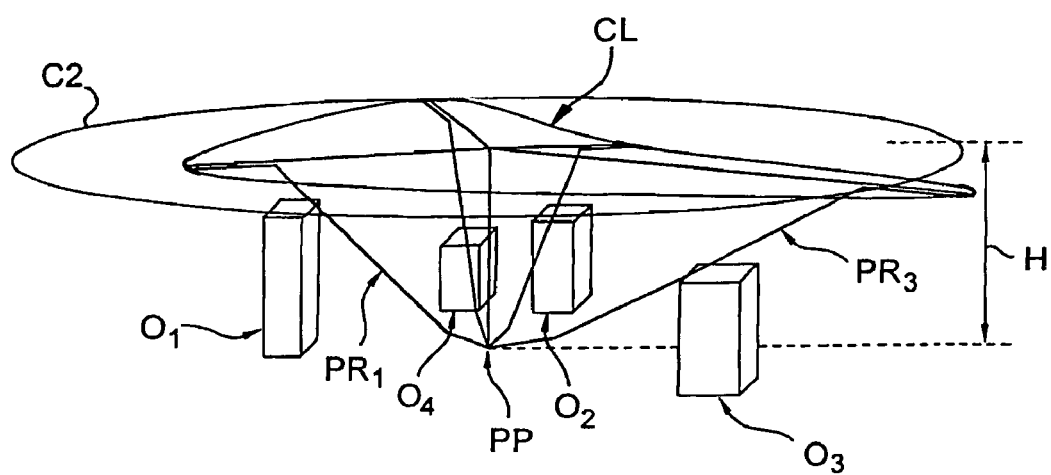
FIG. 4 is a diagram showing how portions of a limit curve are calculated by scanning the space surrounding a landing point with an approach profile comprising three rectilinear segments, in another implementation of the invention.

With reference to FIG. 1, a device of the invention for providing assistance in piloting comprises:

a database 11 containing the coordinates and the dimensions of natural and/or artificial obstacles such as those shown diagrammatically in the form of rectangular blocks in FIGS. 2 and 4;

a computer 10 provided in particular with means 12 for reading the characteristics of obstacles from the database 11;

an input peripheral 14 such as a joystick or other pointer device enabling the coordinates of a landing or takeoff point to be input into the computer 10, and possibly also an approach or departure altitude;

a calculation module or program 13 for responding to the coordinates of the landing or takeoff point and the approach or departure altitude as input using the peripheral 14 to determine the locus of entry and/or exit points for said altitude which, given a predetermined climb/descent profile or template, are not safe; and a module or program 15 for processing the results delivered by the module 13 and connected to a display device 16 for presenting to the pilot a diagram that shows the locus of entry/exit points that are safe and the locus of points that are not safe.

In this figure, the arrows interconnecting the members or units 11 to 16 represent connections between said units or modules and also the directions of the main exchanges of data over said connections.

With reference to FIG. 2, three obstacles O1, O2, and O3 extend around the landing point PP. A ray or straight line passing through the point PP and forming a small constant angle relative to the horizontal, e.g. an angle of 2°, and sweeping through 360° around the point PP generates a cone CON2DEG of apex that coincides with the point PP, that is circularly symmetrical about the normal N to the ground at the point PP, and of cross-section relative to the axis N that is circular.

Thus, the trace of the cone in the horizontal plane P situated at altitude H above the point PP constitutes a circle C2 centered on the vertical projection of the point PP onto the plane P.

Similarly, the trace of a rectilinear ray R1 passing through PP and sliding along the edge ARS1 at the top of obstacle O1 forms in the plane P a limit curve segment TARS1. Similarly, the trace of a rectilinear ray R2 passing through PP and sliding along the edge ARS2 at the top of the obstacle O2 forms in the plane P a segment TARS2, and the trace of a rectilinear ray R3 passing through PP and sliding along the edge ARS3 at the top of the obstacle O3 forms in the plane P a limit curve segment TARS3.

A limit curve CL combining these segments TARS1 to TARS3 can thus be calculated from the traces of the rays bearing against the obstacles surrounding the landing point, which is equivalent to determining minimum approach or departure slopes as a function of the relief.

Figure 3:
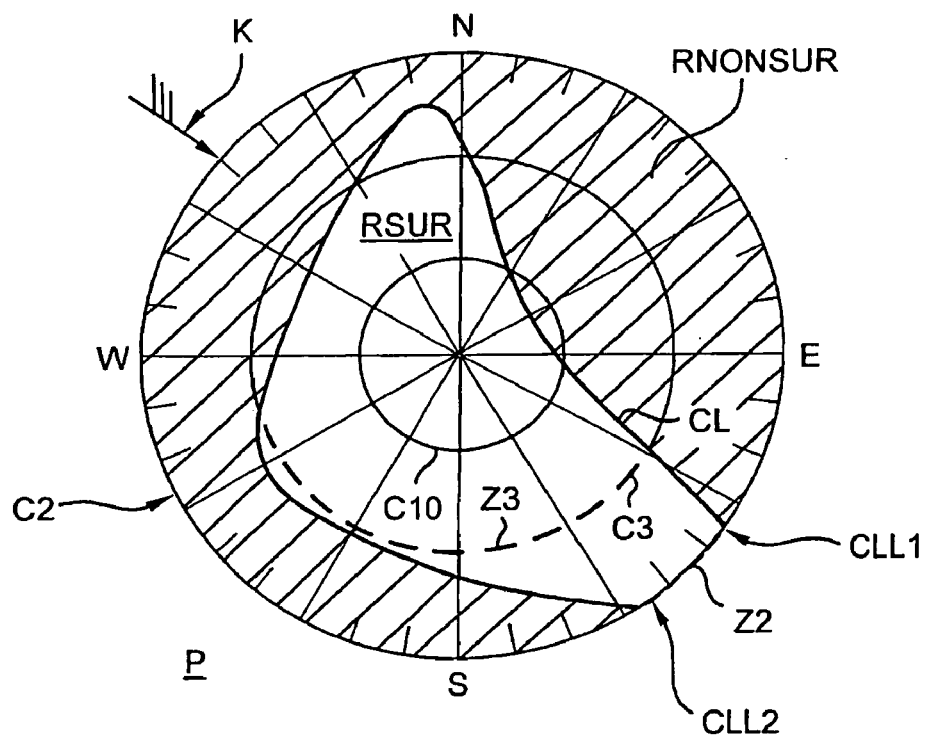
FIG. 3 is a diagram suitable for being presented to a pilot, the diagram including a limit curve similar to that of FIG. 2.

With reference to FIG. 3, the limit curve CL extends inside the circle C2 centered on the vertical projection of the point PP; the curve CL is open: it has two ends CLL1 and CLL2 corresponding to the points where the curve intersects the circle C2. The curve CL subdivides the disk defined by C2 into two regions: a central region RSUR that includes the projection of PP and that constitutes the locus of safe entry or exit points, and a peripheral region RNONSUR which is the locus of entry or exit points that are not safe, which region is shaded.

The diagram also has two circles C3 and C10 concentric with the circle C2; these two circles correspond to the traces in the plane P (the plane of FIG. 3) of rays passing through PP and sweeping the space around said point with a three degree slope (for C3) and a ten degree slope (for C10) respectively.

This diagram enables the pilot to see that a safe approach zone Z2 using a rectilinear descent profile sloping at 2° extends between the points CLL1 and CLL2 on an arc of the circle C2; this diagram also makes it possible to see that a safe approach zone Z3 using a rectilinear descent profile that slopes at 3° extends along an arc of the circle C3.

In practice, for an approach procedure close to a landing point, the pilot selects an initial approach altitude considered to be safe for the zone around the landing point. This altitude defines a horizontal plane or level situated at an altitude H above the landing point. Ignoring relief and wind, the pilot can select a descent profile from said altitude for reaching the landing point.

The simplest descent profile is a straight line starting from the altitude of the above-mentioned plane and reaching the landing point. The slope of this approach axis can vary between limits as a function of the capabilities of aircraft and its configuration. The procedure as described above includes an entry point defined by the point of intersection between the plane (or level) and said straight line, and a final point which is the landing point.

The device sweeps through the space around the landing point, generally through 180° or 360° with a template describing the above-described procedure, possibly causing the slope of the template to vary, where appropriate. It thus determines profiles starting from altitude H and reaching the landing point that are safe and profiles that come into conflict with the ground and/or obstacles of positions and shapes that are recorded in a database.

On a display screen displaying the geographical environment around the landing point, the device traces the locus of all the entry points of descent profiles that are not safe for the initial approach altitude H as defined above.

An upside-down cone having a half-angle at the apex of 88° (90°-2°), with its apex being constituted by the geographical point under consideration and with its base being the initial approach altitude is investigated over 360°. Minimum usable profiles as a function of relief are determined all around the landing point. The entry points of these profiles are projected onto the base of the cone.

The surface RNONSUR describing the portion of the cone that is masked by obstacles is displayed in red.

The displayed size of the device is a function of the selected display scale and the initial approach altitude.

If the initial approach in question is at an altitude of 1500 feet above the landing point, then for a slope of 2° the symbology occupies a circle having a radius of 8 nautical miles.

A pilot seeking to define a safe approach can position the entry point of the procedure outside unsafe zones, i.e. on the portion Z2 of the circle C2 that corresponds to the 2° slope.

This can be done either using traditional data input means, or by means for inputting geographical coordinates.

When inputting geographical coordinates, the pilot positions the entry point directly so that the descent profile is safe, with the zones of safe and unsafe entry/exit points being calculated in real time as a function of the position of the landing point corresponding to the position of the input device. Since the pilot is relieved from verifying mainly that the approach is safe relative to obstacles, it is easier for the pilot to take account of other parameters such as wind direction, not overflying a built-up area, and managing fuel supply.

By means of this device, the pilot can move the landing point around in the landing zone; the pilot can then observe the associated figure CL as calculated in real time and can thus find the landing point and axis for which the locuses of the entry points are optimized, given other constraints set by the pilot, such as wind direction, not overflying certain zones, or a limiting slope.

The simplicity, speed, and interactivity of the device enable it to be used in flight in order to define a new route that has not yet been defined, taking account of slopes that are inaccessible in azimuth or in orientation.

Figure 5:
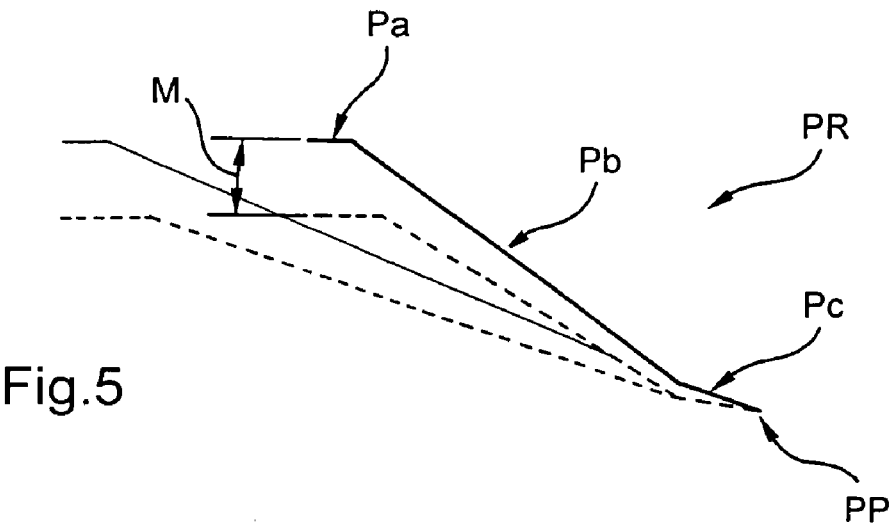
FIG. 5 shows examples of templates having three rectilinear segments and suitable for use in the implementation of FIG. 4.

With reference to FIGS. 4 and 5, the simple straight ray of FIG. 2 can be replaced by a profile PR, PR1, PR2 for calculating the curve CL. The profile PR comprises three rectilinear segments Pa, Pb, and Pc of different slopes, each of which can be associated with an altitude margin M that may be (pre)determined in order to compensate for errors in positioning the point PP, and/or the obstacles, and/or for taking account of overflight margins.

Figure 6:
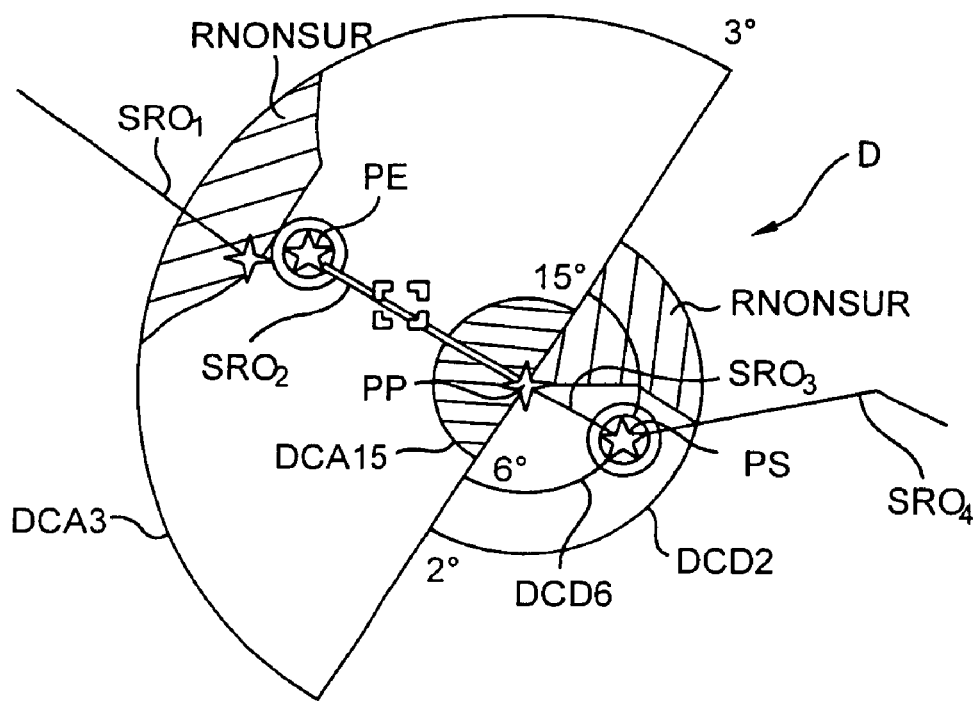
FIG. 6 shows a variant of a diagram for presentation to a pilot.

With reference to FIG. 6, the diagram D comprises two semicircles DCA3 and DCA15 centered on PP and corresponding to slopes approaching the point PP at 3° and at 15°, respectively. The diagram D also shows two semicircles DCD2 and DCD6, likewise centered on PP and corresponding to slopes for taking off from the point PP at 2° and at 6°, respectively.

A point PE represents an entry point at an altitude HE for which the approach (half) diagram has been determined, and for which an approach at a slope lying in the range 3° to 15° is safe. A point PS represents an exit point at an altitude HS for which the takeoff (half) diagram has been determined and for which a takeoff from the point PP along a slope lying in the range 6° to 2° is safe.

The climb limit slope in the event of one engine breaking down in an aircraft having at least two engines can be displayed. It depends on external conditions (wind, temperature, pressure) and on the performance of the aircraft. The value of this slope can be recorded in a memory of the computer 10 and/or can be input by the pilot using the data input member 14.

One or more segments SRO1, SRO2, SRO3, SRO4 of the route selected by the pilot are shown on the diagram; the cardinal points and the wind direction can also appear thereon, as can be seen in FIG. 3. In this example, the segment SRO2 represents the final approach procedure and the segment SRO3 represents the takeoff procedure.

On this route, a star-shaped symbol represents the entry (or exit) point; this symbol is surrounded by a first circle representing a first margin corresponding to a positioning error for the entry point (or the exit point), and a second circle concentric with the first and representing an additional horizontal piloting margin.

The invention claimed is:

1. A method of assisting the piloting of a rotary wing aircraft in the vicinity of a landing or takeoff point, the method comprising:
using a computer configured to determine the locus of entry and/or exit points for a given approach and/or departure altitude that are not safe for reaching said landing point or on leaving said takeoff point of the rotary wing aircraft, on the basis of coordinates for the landing or takeoff point input into the computer by a tool for inputting coordinates and suitable for being manipulated by a pilot, and taking account of a climb/descent template or profile of the rotary wing aircraft; and
presenting a diagram including said locus on a display device,
wherein a limit curve segment is determined corresponding to the trace in the plane or level corresponding to said altitude of the template or profile passing through the landing or takeoff point and grazing or bearing against the top of an obstacle extending in the vicinity of the landing or takeoff point; and wherein at least one segment of the limit curve is determined that extends in a plane or level corresponding to said altitude, the portion of the limit curve separating the locus of safe entry and/or exit points from unsafe entry and/or exit points, and the landing or takeoff point together with the segment of the limit curve are displayed on the display device.

2. The method according to claim 1, in which there is displayed on the display device the diagram including the landing or takeoff point, at least a portion of one or more circles centered on said point, and the limit curve portion, at least.

3. The method according to claim 1, in which a first color or texture is applied to a portion of the diagram extending inside the limit curve portion, and a second color or texture, different from the first color or texture, is applied to the portion of the diagram that extends outside said limit curve portion, and these portions of the diagram are displayed on the display device.

4. The method according to claim 1, in which an altitude margin is associated with the template or profile in order to compensate for errors in positioning the point and/or the obstacle, and/or in order to take account of an overflight margin.

5. The method according to claim 1, in which the template or profile comprises a single rectilinear segment.

6. The method according to claim 1, in which the template or profile comprises a plurality of segments.

7. The method according to claim 6, in which the projections of the segments in a vertical plane are in alignment.

8. The method according to claim 6, in which the projections of the segments in a horizontal plane are in alignment.

9. The method according to claim 1, in which a symbol is displayed on the device representing the entry and/or exit point, said symbol being surrounded by a first circle representing a first margin corresponding to a positioning error for the point and being surrounded by a second circle concentric with the first circle and representing an additional horizontal piloting margin.

10. A device for assisting the piloting of a rotary wing aircraft in the vicinity of a landing or takeoff point,
the device comprising:
a database on a computer readable medium containing characteristics of obstacles;
a computer configured to read the characteristics of obstacles from the database;
a tool for inputting into the computer the coordinates of a landing or takeoff point for said rotary wing aircraft;
the computer configured to respond to the coordinates of the landing or takeoff point and to an approach or departure altitude to determine the locus of entry and/or exit points at said altitude that are unsafe, taking account of a predetermined climb/descent template or profile of said rotary wing aircraft;
and
means for presenting said locus to the pilot,
wherein said computer is configured to determine a limit curve segment corresponding to a trace in a plane or a level corresponding to said altitude of the template or profile passing through the landing or takeoff point and grazing or bearing against the top of an obstacle extending in the vicinity of the landing or takeoff point.

11. The device according to claim 10, in which the database includes the coordinates and the dimensions of natural or artificial obstacles.

12. The device according to claim 10, including a tool for inputting into the computer an approach or departure altitude, which tool is suitable for being manipulated by a pilot of the aircraft.

13. The device according to claim 10, in which the input tool is a pointer device or a joystick.

14. The device according to claim 10, embarked or suitable for embarking on board an aircraft.

15. The device according to claim 10, in which at least one segment of the limit curve is determined that extends in a plane or level corresponding to said altitude, the portion of the limit curve separating the loci of safe entry and/or exit points from unsafe entry and/or exit points, and the landing or take-off point together with the segment of the limit curve are displayed on said means for presenting said locus to said pilot comprising a display device.

16. The device according to claim 15, in which there is displayed on the display device the diagram including the landing or takeoff point, at least a portion of one or more circles centered on said point, and the limit curve portion, at least.

17. The device according to claim 15, in which a first color or texture is applied to a portion of the diagram extending inside the limit curve portion, and a second color or texture, different from the first color or texture, is applied to the portion of the diagram that extends outside said limit curve portion, and these portions of the diagram are displayed on the display device.

18. The method according to claim 2, in which a first color or texture is applied to a portion of the diagram extending inside the limit curve portion, and a second color or texture, different from the first color or texture, is applied to the portion of the diagram that extends outside said limit curve portion, and these portions of the diagram are displayed on the display device.

* * * * *